United States Patent [19]

Loo

[11] Patent Number: 4,639,866

[45] Date of Patent: Jan. 27, 1987

[54] PIPELINED DATA PROCESSING APPARATUS

[75] Inventor: Johnson Loo, Newcastle-Under-Lyme, Great Britain

[73] Assignee: International Computers Limited, London, England

[21] Appl. No.: 690,727

[22] Filed: Jan. 11, 1985

[30] Foreign Application Priority Data

Jan. 24, 1984 [GB] United Kingdom ............... 8401807

[51] Int. Cl.[4] .................................................. G06F 9/38
[52] U.S. Cl. ..................................................... 364/200
[58] Field of Search ... 364/200 MS File, 900 MS File

[56] References Cited

U.S. PATENT DOCUMENTS 4,575,815  3/1986  Delahunt ............................ 364/900

FOREIGN PATENT DOCUMENTS 936331  9/1963  European Pat. Off. .
0063256  10/1982  European Pat. Off. .
2069733  8/1981  Fed. Rep. of Germany .

Primary Examiner—Raulfe B. Zache

Attorney, Agent, or Firm—Lee, Smith & Zickert

[57] ABSTRACT

A pipelined data processor is described, which obeys a sequence of instructions each with a read phase in which an operand is read from a memory, an execute phase in which an operation is performed by an execution unit, and a write phase in which a result is written into the memory. The phases of successive instructions are overlapped, and each instruction is stepped on to its next phase at the end of each clock beat. Each clock beat is divided into a write sub-beat followed by two read sub-beats. The write address for each instruction is stored in a write address register and is compared with each read or write address applied to the memory. When these addresses match, the output of the execution unit is either written into the memory (if the match occurs during a write sub-beat) or fed back to the execution unit as an operand (if the match occurs during a read sub-beat). In the latter case, the operand is made available to the next instruction without having to pass through the memory, and this overcomes the problem of a read/write clash, where one instruction requires to read an operand which has not yet been written by the preceding instruction.

7 Claims, 4 Drawing Figures

PIPELINED DATA PROCESSING APPARATUS

This invention relates to data processing apparatus.

It is known to arrange for instructions in a data processing apparatus to be broken down into a number of phases. For example, each instruction may have a phase in which at least one operand is read from memory, a phase in which an operation is performed on the operand, and a further phase in which a result is written into the memory. The phases of successive instructions may be overlapped, so that while one instruction is performing the write phase, the next following instruction is at the execution phase and the next again instruction is at the operand read phase. This overlapping of phases of successive instructions is usually referred to as pipelining.

The apparatus is usually controlled by a clock signal which advances each instruction to its next phase at each clock beat.

In such an arrangement, it is clear that the apparatus must be able to access two or more operands in each clock beat, i.e. it must be able to write the result from one instruction into the memory and read the operand or operands for a later instruction in the same clock beat. One way of doing this is to use a multi-port memory which allows two or more locations to be accessed simultaneously. However, such memories are complicated and expensive.

One object of the invention is to overcome this problem.

SUMMARY OF THE INVENTION

According to the invention there is provided a pipelined data processing apparatus for obeying a sequence of instructions each of which has a read phase in which one or more operands are read from a memory, an execute phase in which an operation is performed by an execution unit, and a write phase in which a result is written to the memory, the phases of successive instructions being overlapped and the apparatus being controlled by a clock signal which advances each instruction to its next phase at the end of each clock beat, wherein each clock beat is divided into a write sub-beat during which the instruction currently in its write phase writes its result to the memory, and at least one read sub-beat during which the instruction currently in its read phase reads an operand from the memory.

It can be seen that, by dividing the clock beat into separate sub-beats, a plurality of memory accesses can be made within a single clock beat. Thus, a single-port memory can be made to act as if it were a multi-port memory.

One pipelined data processor in accordance with the invention will now be described by way of example with reference to the accompanying drawings.

DESCRIPTION OF AN EMBODIMENT OF THE INVENTION

Figure 1:
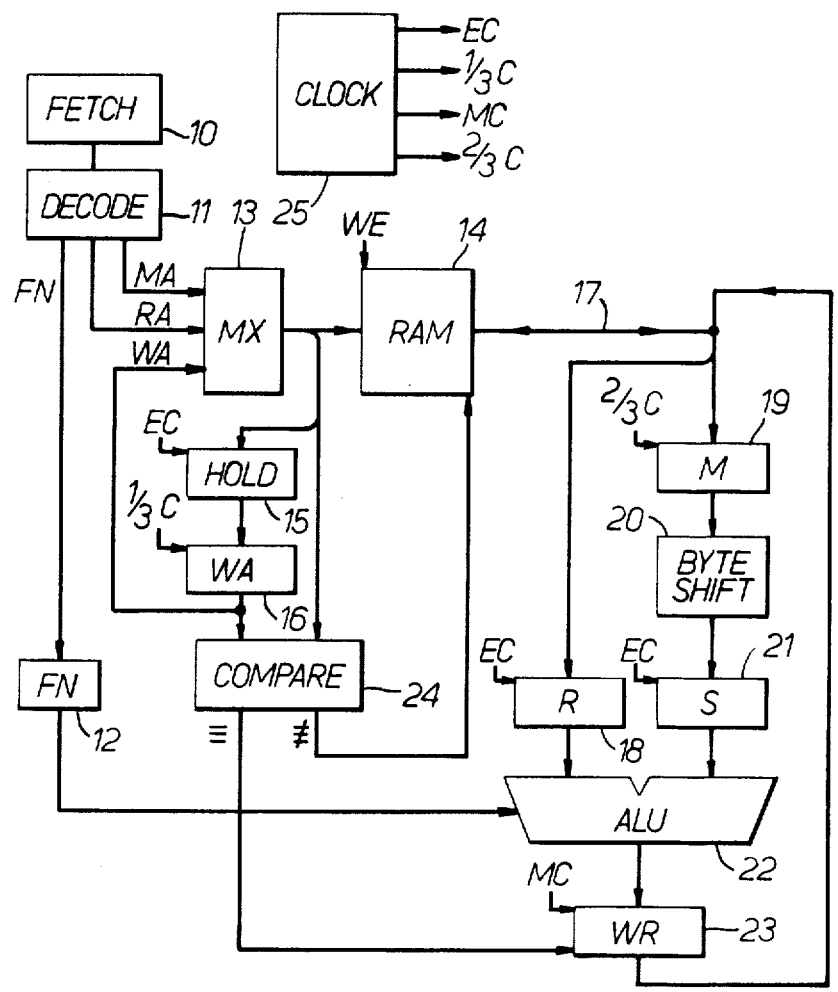
FIG. 1 is a block diagram of the processor.

Referring to FIG. 1, the processor has an instruction fetch unit 10 for fetching sequences of instructions from a main memory (not shown).

Each instruction in turn is decoded by decode logic 11 to produce a pair of operand read addresses MA and RA, and a function code FN. The function code is fed to a register 12 where it is held until it is required. The addresses MA and RA are fed to inputs of a multiplexer 13, along with a write address WA. Each of the addresses MA, RA and WA is four bits wide.

The output of the multiplexer 13 is connected to the address input of a random access memory (RAM) 14 having sixteen individually addressable locations, which acts as a register file for the processor. The output of the multiplexer 13 is also fed to a register 15, referred to as the HOLD register, and then to a register 16, referred to as the WA register. The output of the WA register 16 provides the write address signal WA to the multiplexer 13.

The RAM 14 has a data input/output port which is connected to a bi-directional bus 17. The bus 17 is in turn connected to the inputs of two operand registers 18 and 19 referred to as the R and M registers. The output of the M register is connected by way of a byte shift circuit 20 to a register 21, referred to as the S register. The byte shift circuit 20 is capable of shifting the operand to the right or left in multiples of eight bits.

The outputs of the R and S registers are connected to inputs of an arithmetic and logic unit (ALU) 22. This can perform various operations on the two inputs, under control of the function code FN from the register 12. The output of the ALU 22 is connected to a register 23, referred to as the WR register, which is in turn connected to the bus 17 and hence to the input/output of the RAM 14 and the R and M registers.

The outputs of the RAM 14 and the WR register 23 are tristate logic; that is, if either is disabled, it adopts a neutral condition in which it has no influence on the state of the bus 17.

A comparator 24 continuously compares the output of the multiplexer 13 with the contents of the WA register 16. If they are equal, the comparator produces a control signal which enables the output of the WR register, so that it applies its contents to the bus 17. If, on the other hand, the comparator 24 detects inequality, it enables the output of the RAM 14 instead.

Clock signals (from clock circuit 25)

Figure 2:
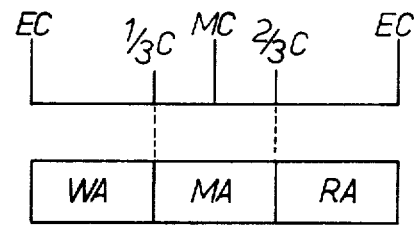
FIG. 2 is a timing diagram showing various timing signals produced in each clock beat.

Referring now to FIG. 2, the processor has a basic clock beat of 120 nanoseconds, defined by a clock signal EC (end clock) which occurs at the end of each beat. A further clock signal MC (mid clock) is produced halfway through each beat, 60 nanoseconds after EC.

The beat is divided into three sub-beats, by means of clock signals ⅓C and ⅔C which occur 40 nanoseconds and 80 nanoseconds respectively after EC.

FIG. 2 also shows the way in which the multiplexer 13 (FIG. 1) is controlled. In the first, second and third sub-beats, it is switched to select the inputs WA, MA and RA respectively.

Operation

Figure 3:
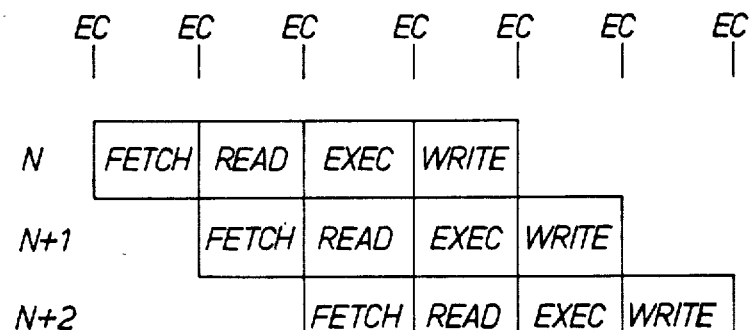
FIG. 3 is a diagram showing the way in which instructions are overlapped.

Referring to FIG. 3, this shows the progress of three successive instructions N, N+1 and N+2. Each instruction has four phases: fetch, read, execute, and write. As shown, the phases of the instructions are overlapped so that, for example while instruction N is in the write phase, instruction N+1 is in the execute phase and instruction N+2 is in the read phase. Each phase occupies one clock beat, from one EC to the next.

The operation of the processor at each phase of a particular instruction will now be described, referring again to FIG. 1.

During the fetch phase, the instruction is fetched by the circuit 10.

At the start of the read phase, the instruction is decoded by the decode logic 11, to produce the operand addresses MA and RA, and the function code FN. During the second sub-beat of the read phase, the multiplexer 13 selects the address MA, and applies it to the RAM 14, so as to address the first operand. This operand is then gated into the M register by the clock ⅓C. During the third sub-beat of the read phase, the multiplexer 13 selects the address RA, and applies it to the RAM 14, so as to address the second operand. This is then gated into the R register by the clock EC. At the same time, the contents of the M register are transferred to the S register, via the byte shift circuit 20. The clock signal EC also gates the output of the multiplexer 13 (i.e. the address RA) into the HOLD register 15.

During the first half of the execute phase, the ALU performs the operation specified by the code FN in the buffer 12. Then, at the clock MC, the result of the operation is gated into the WR register. Also, at the clock ⅓C the contents of the HOLD register 15 are transferred to the WA register 16.

In the first sub-beat of the write phase the multiplexer 13 selects the write address WA from the WA register 16, and applies it to the RAM 14 so as to address the location into which data is to be written. At the clock signal ⅓C, a write enable signal WE is generated, which causes the contents of the write register WR to be written into the RAM 14.

Figure 4:
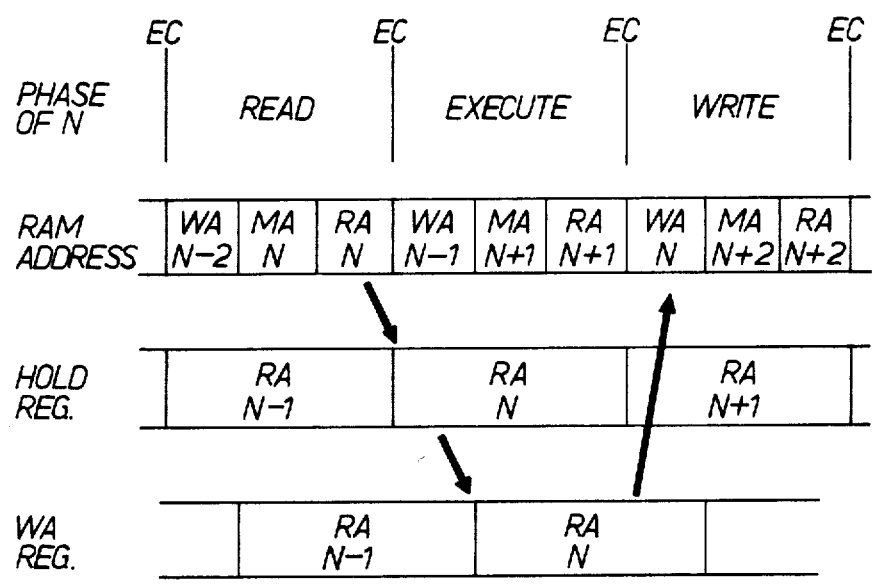
FIG. 4 illustrates the operation of the processor.

FIG. 4 summarises the operation described above, showing the relationship between the RAM address (from the multiplexer 13) and the contents of the HOLD and WA registers.

It can be seen that, in the first sub-beat of each clock beat, the RAM is addressed by the write address WA for a particular instruction (instruction N, say). Then, in the second and third sub-beats, the RAM is addressed by the read addresses MA and RA for the next but one instruction (N+2). Also, during the first half of the clock beat, the ALU performs the specified operation for the intermediate instruction (N+1).

It can also be seen that the read address RA for instruction N is loaded first into the HOLD register and then into the WA register so that it is available in the first beat of the write phase of instruction N, to act as the write address WA. Thus, the write address WA for each instruction is always the same as the second operand address RA.

As described above, the contents of the WA register are continuously compared with the RAM address, by means of the comparator 24. As can be seen from FIG. 4, this means that the WA register, after it is loaded with address RA for instruction N, is compared in successive sub-beats with the read addresses MA and RA for instruction N+1, and with the write address WA for instruction N. This last comparison always gives equality, of course, since the write address WA is derived from the WA register. Therefore, the output of the WR register is always enabled by the comparator 24 during the write sub-beat. This permits the contents of WR to be written to the RAM as described above.

If neither of the addresses MA or RA is equal to the WA register, the comparator 24 indicates inequality during the two read sub-beats. Thus, the comparator enables the RAM output, allowing the addressed operands to be read out of the RAM and gated into the M and R registers as described above.

Suppose now that instruction N writes an operand to the RAM, and that the following instruction N+1 requires to read the same operand; i.e. one of the read addresses MA or RA for instruction N+1 is equal to the write address WA for instruction N. It can be seen from FIG. 4 that this creates a problem, since the read sub-beats for instruction N+1 occur before the write sub-beat for instruction N.

This situation is detected by the comparator circuit 24, which will find equality between the contents of the WA register and the RAM address during the MA or RA sub-beat of instruction N+1. The comparator therefore enables the output of the WR register, rather than that of the RAM. This causes the output of the WR register to be written into the M or R register when that register is clocked. Thus, the result for instruction N (which is held in the WR register) is gated directly into the M or R register, by-passing the RAM. The required operand is therefore available to instruction N+1 at the correct time.

The contents of the WR register are also written into the RAM in the normal way during the following beat.

It can be seen therefore that the comparator 24 serves a dual function:

(a) It enables the output of the WR register at the appropriate sub-beat to allow the result of an instruction to be written into the RAM.

(b) It also detects read/write clashes, by comparing the write address of each instruction with both the read addresses of the next instruction.

Thus, the comparator 24 represents a very economical use of logic.

It can also be seen that the division of the clock beat into three sub-beats permits the RAM 14 to act effectively as a three-port memory, allowing a write access and two read accesse in each clock beat.

I claim:

1. Pipelined data processing apparatus for obeying a sequence of instructions, comprising:
 (a) a memory,
 (b) clock means for producing first clock signal defining a clock beat and at least one further clock signal which divides each clock beat into a write sub-beat and at least one read sub-beat,
 (c) means responsive to the first clock signal for advancing each instruction through a read phase, an execute phase, and a write phase during successive clock beats,
 (d) execution means connected to the memory and operative during each clock beat to perform a function specified by the instruction currently in its execute phase, thereby producing a result for the instruction,
 (e) write means operative during the write sub-beat of each clock beat to write to the memory the result of the instruction currently in its write phase,
 (f) read means operative during the read sub-beat of each clock beat to read an operand from the memory for the instruction currently in its read phase,
 (g) detection means connected to said write means and to said read means for detecting a read/write clash in which the instruction currently in its read phase requires to read from the memory an operand which is about to be written by the instruction currently in its execute phase, and (h) means connected to said execution means and to said detection means and operative upon detection of said read/write clash, for making the result of the instruction currently in its execute phase directly available as an operand for the instruction currently in its read phase.

2. Pipelined data processing apparatus for obeying a sequence of instructions, comprising:

(a) a memory having an address input, (b) clock means for producing a first clock signal defining a clock beat and at least one further clock signal which divides each clock beat into a write sub-beat and at least one read sub-beat, (c) means responsive to the first clock signal for advancing each instruction through a read phase, an execute phase and a write phase during successive clock beats, (d) means for producing a write address and at least one read address for each instruction, (e) execution means connected to the memory and operative during each clock beat to perform a function specified by the instruction currently in its execute phase thereby producing a result for that instruction, (f) a write address register for storing the write address of each instruction during the execute phase of that instruction, and for applying the write address to the address input of the memory during the write phase of that instruction, (g) read means operative during the read sub-beat of each clock beat to apply the read address of the instruction currently in its read phase to the address input of the memory, (h) a comparator for comparing the contents of the write address register with each read and write address applied to the memory, (i) means operative in the event that the comparator detects inequality, for reading an operand from the memory to the execution means, (j) means operative in the event that the comparator detects equality during a write sub-beat, for writing the result from the execution means into the memory, and (k) means operative in the event that the comparator detects equality during a read sub-beat, for feeding the result from the execution means back to the execution means as an operand.

3. Apparatus according to claim 2 wherein the write address of each instruction is derived from the read address of that instruction.

4. Apparatus according to claim 2 including means for loading the write address of each instruction into the write address register at the end of the write sub-beat during the execute phase of that instruction.

5. Pipelined data processing apparatus for obeying a sequence of instructions, comprising:

(a) a memory having an address input, a data input, and a data output, (b) clock means for producing a first clock signal defining a clock beat and at least one further clock signal which divides each clock beat into a write sub-beat and at least one read sub-beat, (c) means responsive to the first clock signal for advancing each instruction through a read phase, an execute phase and a write phase during successive clock beats, (d) means for producing a write address and at least one read address for each instruction, (e) execution means having a data input connected to the data output of the memory and having a data output, the execution means being operative during each clock beat to perform a function specified by the instruction currently in its execute phase thereby producing a result for that instruction, (f) a write address register for storing the write address of each instruction during the execute phase of that instruction, and for applying the write address to the address input of the memory during the write phase of that instruction, (g) read means operative during the read sub-beat of each clock beat to apply the read address of the instruction currently in its read phase to the address input of the memory, (h) a write data register having an input connected to the data output of the execution means, and having an output connected to the data input of the memory and also connected to the data input of the execution means, (i) a comparator for comparing the contents of the write address register with each read and write address applied to the memory, (j) means operative in the event that the comparator detects inequality, for enabling the output of the memory, and (k) means operative in the event that the comparator detects equality, for enabling the output of the write data register.

6. Apparatus according to claim 5 wherein each clock beat is divided into three sub-beats comprising a write sub-beat followed by two read sub-beats.

7. Apparatus according to claim 6 including means for loading said write data register during the first of said read sub-beats.

* * * * *